3,078,266
POLYAZO-DYESTUFFS
Walter Hanhart, Riehen, Switzerland, assignor to Ciba
  Limited, Basel, Switzerland, a Swiss firm
No Drawing. Filed July 20, 1959, Ser. No. 828,037
Claims priority, application Switzerland Aug. 6, 1958
            8 Claims. (Cl. 260—146)

This invention provides valuable new polyazo-dyestuffs of the general formula (1)
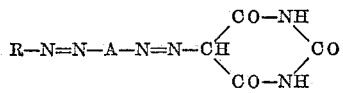

in which R represents the radical of a diazo-component containing at least one azo linkage, and which radical contains in a position vicinal to the —N=N—A— grouping a group capable of taking part in the formation of heavy metal complexes, and A represents the radical of a hydroxynaphthalene sulfonic acid bound to the R—N=N— group in a position vicinal to the hydroxyl group, and also provides complex heavy metal compounds, especially complex copper compounds, of the polyazo-dyestuff of the above formula.

The invention also provides a process for the manufacture of the dyestuffs of the above general Formula 1, wherein barbituric acid is coupled with a diazo compound of an amino-polyazo-dyestuff of the general formula (2)         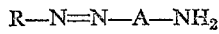

or of a complex heavy metal compound of such dyestuff, in which formula R represents the radical of a diazo-component containing at least one azo linkage, and which radical contains in a position vicinal to the —N=N—A— grouping a group capable of taking part in the formation of heavy metal complexes, and A represents the radical of a hydroxynaphthalene sulfonic acid bound to the azo linkage in a position vicinal to the hydroxyl group, and which radical advantageously contains the —NH$_2$ group bound directly to the naphthalene nucleus.

The metal-free dyestuffs of the Formula 2 used as starting materials can be obtained by coupling an aminonaphthol sulfonic acid (for example, 2-amino-5-hydroxynaphthalene-7-sulfonic acid, 2-amino-6-hydroxynaphthalene-8-sulfonic acid, 2-amino-8-hydroxynaphthalene-6-sulfonic acid or 1-amino-8-hydroxynaphthalene-3:6- or -4:6-disulfonic acid) in a position vicinal to the hydroxyl group with a diazo-compound of an amino-azo-dyestuff of the formula R—NH$_2$, which contains in a position vicinal to the diazo-group a grouping capable of taking part in the formation of metal complexes, for example, a carboxyl group or a hydroxyl group that may be etherified.

Instead of the aforesaid aminonaphthlo sulfonic acids, which contain the amino group bound directly to the naphthalene nucleus, there may be used aminonaphthol sulfonic acids which contain this diazotizable amino group in an external nucleus, for example, in a benzoyl radical. As examples of such aminonaphthol sulfonic acids there may be mentioned 2-(4'-aminophenylamino)-5-hydroxynaphthalene-7-sulfonic acid and more especially 2-(4'-aminobenzoylamino) - 5 - hydroxynaphthalene-7-sulfonic acid.

As diazotized amino-azo-dyestuffs there may be mentioned diazo-compounds of amino-monoazo- as well as amino-disazo-dyestuffs, which can be made by the usual methods, for example, by coupling any desired diazo-compound with a coupling component containing a free amino group and containing in a position vicinal to the free amino group a grouping capable of taking part in the formation of metal complexes, for example, with a 2-alkoxy-1-aminobenzene unsubstituted in the 4-position, such as 2-methoxy-1-aminobenzene, 2-methoxy-5-methyl-1-aminobenzene, 2:5-dimethoxy- or 2:5-diethoxy-1-aminobenzene or the like, or with a 2-alkoxy- or 2-carboxy-methoxy-1-aminonaphthalene derivative, such as a 2-methoxy-1-amino-naphthalene monosulfonic acid unsubstituted in the 4-position. As diazo-components to be coupled with such coupling components for making the starting components of the formula R—NH$_2$ there may be mentioned:

(a) Simple benzene or naphthalene derivatives: aminosalicylic acid, aminobenzoic acids, aminobenzene-ortho-, -meta- or -para-sulfonic acid, 1-aminobenezene-2:5-disulfonic acid, 4-chloro-1-aminobenzene-2-sulfonic acid, and also nitro- or chloro-anilines, 4-amino-4'-acetylaminodiphenyl-3-sulfonic acid, 1-aminonaphthalene-3:6-disulfonic acid, 2-aminonaphthalene-4:8-disulfonic acid or dehydrothiotoluidine mono- or di-sulfonic acids; (b) Amines containing azo linkages, such as amino-azobenzene mono- or di-sulfonic acid, and those obtainable by coupling a diazo-compound of an amine mentioned under (a) with a coupling component containing a diazotizable amino group, such as 3-methyl-aniline, 1-aminonaphthalene-6- or -7-sulfonic acid and also the coupling components mentioned above that contain amino groups, and also those obtainable by coupling a diazo-compound of a monoacylated diamine with any desired coupling component and subsequently hydrolyzing the acylamino group to form a free amino group.

Useful amino-azo-dyestuffs of the Formula 2 can be obtained by coupling a tetrazotized diamine, which contains in a position vicinal to the diazo-group a grouping capable of taking part in the formation of metal complexes, for example, by coupling tetrazotized 4:4'-diamino-3:3'-dimethoxy-diphenyl, on the one hand, with an aminonaphthol sulfonic acid capable of coupling in a position vicinal to the hydroxyl group and, on the other, with any desired coupling component, and advantageously one capable of forming metal complexes.

As diazo-components to be coupled with the aforesaid coupling components for making the starting compounds of the formula R—NH$_2$, there may also be used the complex metal compounds thereof which are obtainable by the metallization of monoazodyestuffs obtainable, for example, from 1-aminophenyl-3-methyl-5-pyrazolones, 1-aminophenyl-3-carboxy-5-pyrazolones, 1-aminostilbenyl-3-methyl-5-pyrazolone-2':2''-disulfonic acid and diazotized ortho-aminophenols and sulfonic acids thereof or diazotized ortho-aminobenzoic acids and sulfonic acids thereof.

The dyestuffs of the Formula 2 can be made by the usual known methods. The initial components are advantageously coupled with the aminonaphthol sulfonic acids in an alkaline medium. Before or preferably after the diazotization and coupling of the amino-azo-dyestuffs so obtained, of which a large number is known with barbituric acid, they may be converted into complex metal compounds thereof. As agents yielding metal there may be used, for example, agents yielding nickel but preferably agents yielding copper. The treatment with the agent yielding metal is advantageously carried out in such manner that a complex metal compound of an ortho-carboxy-ortho'-hydroxy- or ortho:ortho'-dihydroxy-azo-dyestuff is formed, that is to say, in such manner that any alkoxy group present in ortho-position to the azo linkage is split up and one atom of metal is bound in complex union, for example, with one ortho:ortho'-dihydroxy-azo-grouping or one ortho-hydroxy-ortho'-carboxy-azo-grouping.

The treatment with the agent yielding metal is therefore to be carried out in such manner that an ortho:ortho'- dihydroxy-azo-copper complex is formed, when the metallizable grouping is an ortho:ortho'-dihydroxy-azo- or ortho-hydroxy-ortho'-alkoxy-azo-grouping. As is known this reaction takes place more easily with an ortho:ortho'-dihydroxy-azo-grouping than with an ortho-hydroxy-ortho'-alkoxy-azo-grouping, so that in the latter case a longer period of reaction and/or a higher temperature is required. The metallization is carried out, for example, with a salt of divalent copper or nickel in a weakly acid aqueous medium. The dyestuffs can also be metallized by the known method in which the metallization is carried out in an aqueous medium advantageously for several hours in the vicinity of 100° C. with the use of a nickel- or copper-tetrammine complex in the presence or absence of an excess of amine or ammonia. Of special advantage in some of these cases is the process of Patent No. 2,536,957, which is carried out in the presence of a hydroxyalkylamine, especially ethanolamine, or a copper complex derived therefrom.

The dyestuffs of the general Formula 2 which contain in a position vicinal to the azo linkage connecting R with A an alkoxy group bound to a naphthalene radical, for example, dyestuffs of which the radical R in the Formula 2 has the formula

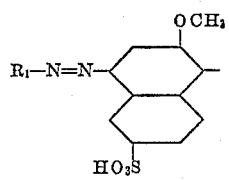

in which $R_1$ represents the radical of any desired diazo-component, are in general advantageously coppered with copper sulfate in the presence of an alkali metal acetate.

On the other hand, those dyestuffs which contain at the aforesaid position in the molecule an alkoxybenzene radical, for example, a radical of the formula

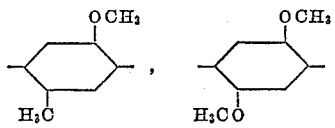

or

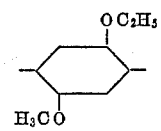

are advantageously converted into the ortho:ortho'-dihydroxy-copper complex by means of a copper-tetrammine sulfate.

The metalliferous dyestuffs so obtained are also largely known and correspond to the Formula 2.

The diazo-compounds obtained from the amino-azo-dyestuffs of the Formula 2 or their complex metal compounds are coupled with barbituric acid to form the dyestuffs of the Formula 1 advantageously in a weakly alkaline medium. The dyestuffs so obtained, which contain no heavy metal in complex union, can be metallized, for example, by the methods described above for metallizing the starting dyestuffs of the Formula 2.

The dyestuffs of this invention, that have the Formula 1, can also be made by a modification of the process described above, wherein a diazotized amino-azo-dyestuff, which contains in a position vicinal to the diazo group a grouping capable of taking part in the formation of metal complexes, for example, a hydroxyl, alkoxy or carboxyl group, is coupled with a monoazo-dyestuff of the formula (4)

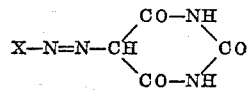

in which X represents the radical of a hydroxynaphthalene sulfonic acid capable of coupling in a position vicinal to the hydroxyl group and bound directly to the azo linkage, and, if desired, the polyazo-dyestuffs so obtained is converted into a complex heavy metal compound thereof.

For making the dyestuffs of the Formula 4 there may be used as diazo-components the amino naphthol sulfonic acids mentioned above for use as coupling components in making the dyestuffs of the Formula 2. As amino-azo-dyestuffs to be coupled with the dyestuffs of the Formula 4 there are used in this modification of the process the products obtainable by the methods described above for making the compounds of the formula R—$NH_2$.

The polyazo-dyestuffs of this invention are suitable for dyeing or printing a very wide variety of materials, for example, those of animal origin, such as wool, silk or leather, and especially for dyeing or printing cellulosic materials, such as cotton, linen, artificial silk or staple fibers of regenerated cellulose. Those dyestuffs that contain no heavy metal or contain a metallizable group may be treated on the fiber or in the dyebath with an agent yielding a heavy metal, advantageously an agent yielding copper.

In some cases especially valuable dyeings are obtained by using the process in which a dyeing or print produced with the metal-free dyestuff is after-treated with an aqueous solution which contains a water-soluble, and especially complex, copper compound and a basic formaldehyde condensation product of a compound containing at least once an atomic grouping of the formula

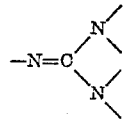

for example, dicyandiamide or dicyandiamidine, or a compound, for example, cyanamide, that is easily convertible into a compound containing such an atomic grouping. Such a process is described, for example, in Patent No. 2,526,106.

The dyeings produced with the new dyestuffs in the manner described above are usually distinguished by their good properties of wet fastness, and especially their very good fastness to light and good capacity for being discharged.

The following examples illustrate the invention, the parts and percentages being by weight:

*Example 1*

6.2 parts of the disazo-dyestuff of the formula

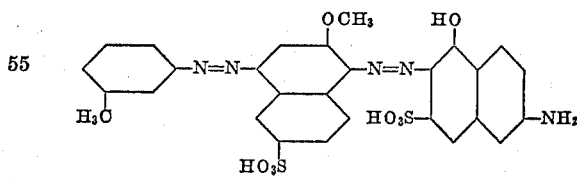

are dissolved in 100 parts of warm water in the form of the sodium salt. The solution is cooled to 5–10° C., 0.7 part of sodium nitrite is added dissolved in water, and then 4 parts of hydrochloric acid of 30% strength are added, diluted with a small amount of water, the whole is stirred for a few hours, while cooling, and then coupling is carried out with a solution of 1.3 parts of barbituric acid rendered alkaline with sodium carbonate. When the coupling is complete 5 parts of sodium chloride are added for every 100 parts by volume of solution, and the precipitated dyestuff is filtered off. By heating the precipitate for several hours in a weak acetic acid solution with copper acetate the complex copper compound is made in known manner. The latter compound is dried, and is a green-black powder which dissolves in water with a green coloration, and yields green dyeings on cotton or viscose.

Similar dyestuffs are obtained by using, instead of the dyestuff obtained from 1-amino-3-methylbenzene, one of the dyestuffs of the formulae given in column I of the following table, in which are given in column II the tints of the dyeings produced on cotton with the finished cupriferous barbituric acid-dyestuff.

| | I | II |
|---|---|---|
| 1 | Cl—C₆H₃(SO₃H)—N=N—C₆H₂(OCH₃)(SO₃H)—N=N—C₁₀H₄(OH)(SO₃H)(NH₂) | Bluish green. |
| 2 | C₁₀H₅(SO₃H)₂—N=N—C₆H₂(OCH₃)(SO₃H)—N=N—C₁₀H₄(OH)(SO₃H)(NH₂) | Do. |
| 3 | H₃C—C₆H₃(SO₃H)—N=N—C₆H₂(OCH₃)(SO₃H)—N=N—C₁₀H₄(OH)(SO₃H)(NH₂) | Do. |
| 4 | H₃CCOHN—C₆H₄—C₆H₃(SO₃H)—N=N—C₆H₂(OCH₃)(SO₃H)—N=N—C₁₀H₄(OH)(SO₃H)(NH₂) | Do. |
| 5 | H₃C-benzothiazole-C₆H₃(SO₃H)—N=N—C₆H₂(OCH₃)(SO₃H)—N=N—C₁₀H₄(OH)(SO₃H)(NH₂) | Green. |
| 6 | C₆H₄(SO₃H)—N=N—C₆H₂(OCH₃)(SO₃H)—N=N—C₁₀H₄(OH)(SO₃H)(NHCO—C₆H₄—NH₂) | Do. |
| 7 | C₆H₅—N=N—C₆H₂(OCH₃)(SO₃H)—N=N—C₁₀H₄(OH)(SO₃H)(NH₂) | Bluish green. |
| 8 | C₆H₄(SO₂NH₂)—N=N—C₆H₂(OCH₃)(SO₃H)—N=N—C₁₀H₄(OH)(SO₃H)(NH₂) | Do. |
| 9 | Cl—C₆H₄—N=N—C₆H₂(OCH₃)(SO₃H)—N=N—C₁₀H₄(OH)(SO₃H)(NH₂) | Do. |

TABLE—Continued

| | I | II |
|---|---|---|
| 10 | [structure: CH₃COHN-Ph-N=N-(naphthalene with OCH₃, HO₃S)-N=N-(naphthalene with HO, HO₃S, NH₂)] | Do. |
| 11 | [structure: O₂N-Ph-N=N-(naphthalene with OCH₃, HO₃S)-N=N-(naphthalene with HO, HO₃S, NH₂)] | Green. |
| 12 | [structure: Ph(HO₃S)-COHN-Ph-N=N-(naphthalene with OCH₃, HO₃S)-N=N-(naphthalene with HO, HO₃S, NH₂)] | Bluish green. |
| 13 | [structure: Ph(SO₃H, SO₃H)-N=N-(naphthalene with OCH₃, HO₃S)-N=N-(naphthalene with HO, HO₃S, NH₂, Cl)] | Do. |

Example 2

6.7 parts of the disazo-dyestuff of the formula

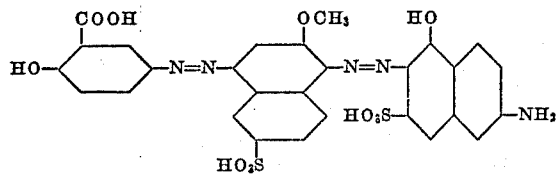

are dissolved in the form of the sodium salt in 75 parts of warm water. The solution is cooled to 5–10° C., 0.7 part of sodium nitrite, dissolved in water, is added, and then 4 parts of hydrochloric acid of 30% strength, diluted with a little water, are added, and the whole is stirred in the cold for a few hours. Coupling is then carried out with 1.3 parts of barbituric acid in a solution rendered alkaline with sodium carbonate. When the coupling is finished the precipitated trisazo-dyestuff is filtered off, and converted in acetic acid solution into its complex copper compound by heating it with copper acetate in known manner. When dry, the copper complex compound is a green-black powder which dissolves in water with a green coloration, and yields green dyeings on cotton or viscose, which are fast to washing when after-treated with copper salts.

Similar dyestuffs are obtained by using, instead of the starting dyestuff of the above formula, the following disazo-dyestuffs.

| | |
|---|---|
| 1 | [structure: HO-Ph(COOH)-NHCO-Ph-N=N-(naphthalene with OCH₃, HO₃S, SO₃H)-N=N-(naphthalene with HO, HO₃S, NH₂)] |
| 2 | [structure: HO-Ph(COOH)-N=N-(naphthalene with OCH₃, HO₃S, SO₃H)-N=N-(naphthalene with HO, HO₃S, NHCO-Ph-NH₂)] |
| 3 | [structure: HO-Ph(COOH)-N=N-(naphthalene with OCH₃, HO₃S)-N=N-(naphthalene with HO, SO₃H, NHCO-Ph-NH₂)] |

Example 3

9 parts of the disazo-dyestuff of the formula

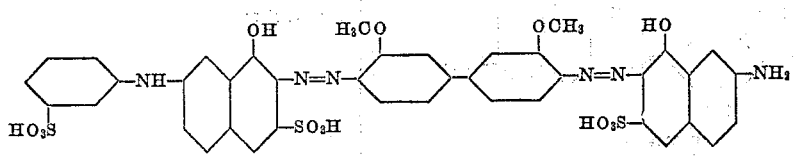

are dissolved in the form of the sodium salt in 450 parts of hot water. The solution is then cooled with ice to about 5° C., 0.7 part of sodium nitrite, dissolved in a small amount of water, is added, and diazotization is brought about by adding 5 parts of hydrochloric acid of 30% strength. The whole is stirred for a few hours, while cooling, and then coupling is carried out with 1.3 parts of barbituric acid in a solution rendered alkaline with sodium carbonate. When the coupling is complete the trisazo-dyestuff formed is precipitated by the addition of sodium chloride, the dyestuff is filtered off and then converted into its complex copper compound in known manner by heating it with an ammoniacal solution of copper oxide, if desired, in the presence of a small amount of pyridine. The complex copper compound, when dry, is a blackish powder which dissolves in water to give a dull blue coloration. It dyes cotton or viscose grey tints.

Grey-dyeing complex copper compounds are obtained in a similar manner from the dyestuffs of the formulae

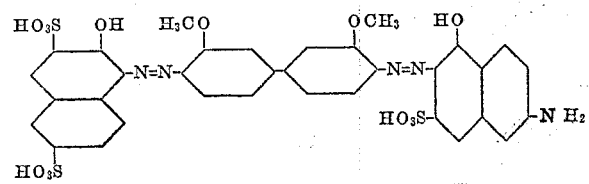

and

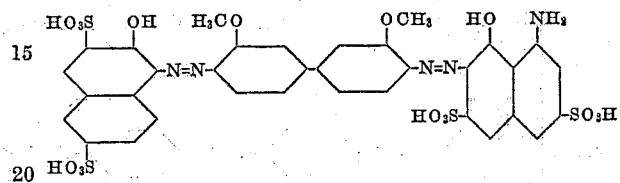

Example 4

7.9 parts of the trisazo-dyestuff of the formula

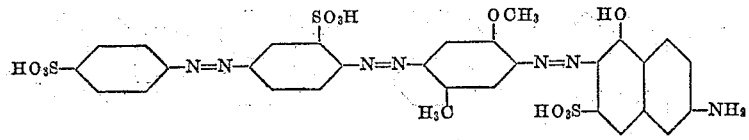

are dissolved in the form of the sodium salt in 100 parts of hot water and cooled by the addition of ice to 5–10° C. 0.7 part of sodium nitrite in aqueous solution and 4.5 parts of hydrochloric acid of 30% strength diluted with a little water are added, and the whole is stirred for a few hours in the cold. Coupling with 1.3 parts of barbituric acid is then carried out in a solution rendered alkaline with sodium carbonate. When the coupling is finished the precipitated dyestuff is filtered off, and converted into its complex copper compound in known manner by heating it with an ammoniacal solution of copper oxide. The complex copper compound, when dry, is a blackish powder which dissolves in water with a green coloration, and dyes cotton blackish olive-grey tints.

Similar dyestuffs are obtained by using as starting materials the following dyestuffs:

| | Structure | Color |
|---|---|---|
| 1 | (structure with $SO_3H$, $SO_3H$, $H_3C$, $H_3C$, $OCH_3$, $HO$, $HO_3S$, $NH_2$) | Blackish olive-green. |
| 2 | (structure with $SO_3H$, $SO_3H$, $H_3C$, $H_3C$, $OCH_3$, $OH$, $SO_3H$, $NH_2$) | Olive-green. |
| 3 | (structure with $SO_3H$, $SO_3H$, $H_3C$, $OCH_3$, $OCH_3$, $HO$, $SO_3H$, $NH_2$) | Do. |

| | | |
|---|---|---|
| 4 | [structure] | Greyish olive. |
| 5 | [structure] | Green. |
| 6 | [structure] | Do. |
| 7 | [structure] | Blackish olive-green. |
| 8 | [structure] | Olive. |
| 9 | [structure] | Green. |
| 10 | [structure] | Do. |
| 11 | [structure] | Do. |

In the case of dyestuffs derived from 1-amino-2-methoxynaphthalene sulfonic acids from the coppering is advantageously carried out in an acetic acid medium. The sequence of the operations can generally be varied, for example, dyestuff No. 1 in the table can equally well be prepared by coupling the disazo-dyestuff of the formula

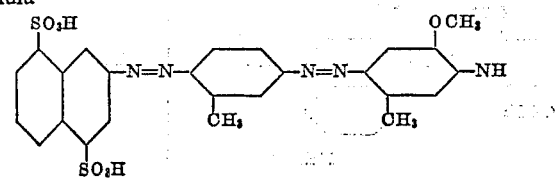

with the monoazo-dyestuff of the formula

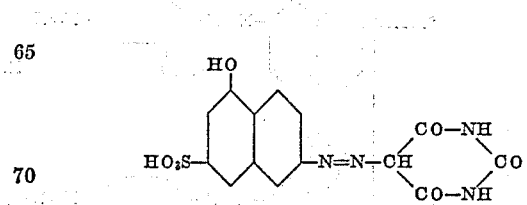

or by carrying out the coppering before the final coupling operation with barbituric acid.

Example 5

12.2 parts of the disazo-dyestuff of the formula

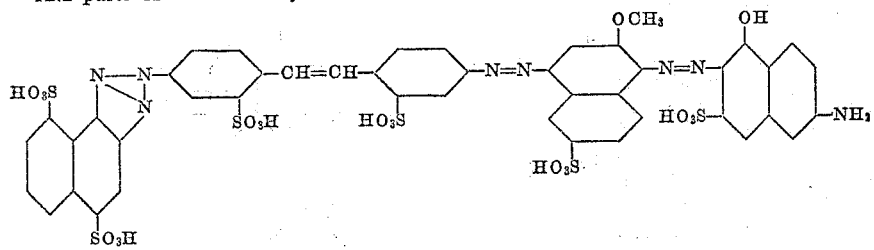

are dissolved as the sodium salt in 120 parts of water. At 5–6° C. an aqueous solution of 0.7 part of sodium nitrite and 3.5 parts of hydrochloric acid of 30% strength, diluted with a little water, are added. The diazotization finishes rapidly. Coupling with 1.3 parts of barbituric acid is then carried out in a solution rendered alkaline with sodium carbonate, while cooling. The trisazo-dyestuff precipitates completely. It is filtered off and converted into its complex copper compound in known manner by heating it in a weakly acetic acid solution with copper acetate. The dyestuff dissolves in water with a green coloration and yields green dyeings on cotton or viscose.

Similar dyestuffs are obtained by using instead of 1-aminonaphthalene-4:8-disulfonic acid to form the triazole, disulfonic acid, 1-aminonaphthalene-4-sulfonic acid or 2-aminonaphthalene-6-sulfonic acid.

Example 6

12.3 parts of the trisazo-dyestuff of the formula are dissolved as the sodium salt in 180 parts of warm water. The solution is cooled to 5–10° C. and 0.7 part of sodium nitrite is added as an aqueous solution and 4 parts of hydrochloric acid of 30% strength, diluted with a little water, are added. The whole is stirred for a few hours, while cooling, and coupling with 1.3 parts of barbituric acid is then carried out in a solution rendered alkaline with sodium carbonate. The precipitated dyestuff is filtered off, and converted into its complex copper compound by heating it in acetic acid solution with copper acetate. The complex copper compound, when dry, is a dark green powder which dissolves in water with a green coloration and yields olive-green dyeings on cotton.

Similar dyestuffs, which dye vegetable fibers green tints, are obtained by using trisazo-dyestuffs of the formulae another aminonaphthalene sulfonic acid, such as 1-aminonaphthalene-3:6-disulfonic acid, 2-aminonaphthalene-5:7-

Example 7

11.6 parts of the trisazo-dyestuff of the formula are dissolved as the sodium salt in 200 parts of water. 0.7 part of sodium nitrite and 4 parts of hydrochloric acid of 30% strength, diluted with a little water, are added, and the whole is stirred in the cold for a few hours. Coupling with 1.3 parts of bartituric acid is then carried out in a solution rendered alkaline with sodium carbonate, and the dyestuff formed is precipitated by adding 10 parts of sodium chloride for every 100 parts by volume of liquor. By heating the precipitate in a weekly acetic acid solution with copper acetate the complex copper compound is prepared in known manner. When dry it is a dark green powder which dissolves in water with a green coloration and yields green dyeings on cotton or viscose.

*Example 8*

1.84 parts of 4:4'-diaminodiphenyl are tetrazotized, then coupled in alkaline solution on one side with 1.8 parts of 1-hydroxybenzene-2-sulfonic acid and then in neutral or weakly acid solution with 2.5 parts of 1-amino-2-methoxynaphthalene-6-sulfonic acid. When the coupling is finished the disazo-dyestuff obtained is isolated, then diazotized, and coupled in alkaline solution with 2.4 parts of 2-amino-5-hydroxynaphthalene-7-sulfonic acid. The trisazo-dyestuff is precipitated by the addition of sodium chloride, then dissolved by the addition of 8 parts by volume of a 2 N-solution of sodium hydroxide, and diazotized after the addition of sodium nitrite and hydrochloric acid and a little ice in the usual manner. The product is then coupled with 1.3 parts of barbituric acid in a solution rendered alkaline with sodium carbonate. The complex copper compound of the resulting dyestuff of the formula

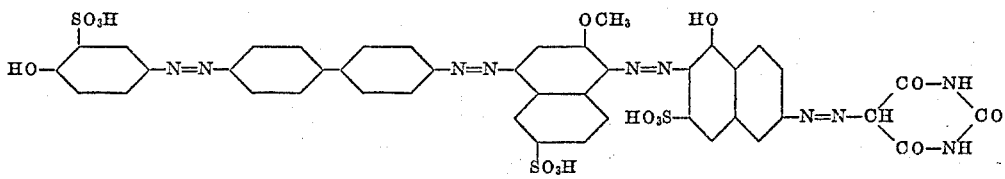

is obtained by heating the dyestuff for several hours with copper acetate in a weakly acetic acid solution. The copper compound is filtered off and dried, and is then a black powder which dissolves in concentrated sulfuric acid with a blackish brown coloration and in water with a green coloration. It dyes vegetable fibers olive-green tints that are fast to light.

*Example 9*

100 parts of cotton are entered at 40° C. into a dyebath which contains in 3000 parts of water 1 part of the dyestuff obtainable as described in the first paragraph of Example 1. Dyeing is carried on for half an hour while raising the temperature of 90° C., then 30 parts of crystalline sodium sulfate are added, and dyeing is continued for a further ½ hour at 90–95° C. The cotton is then rinsed and dried. There is obtained a green dyeing of very good fastness to light.

What is claimed is:

1. A complex copper compound of polyazo-dyestuffs of the formula

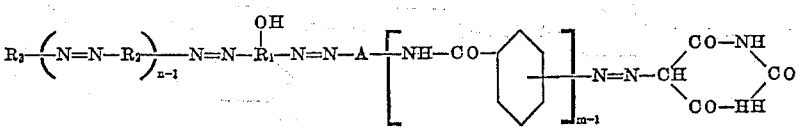

in which $n$ and $m$ each is a positive whole number up to 2, $m+n$ is at most 3, A is a radical selected from the group consisting of

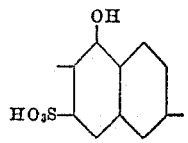

and

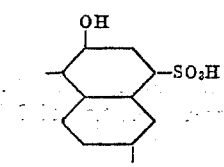

$R_1$ is a member selected from the group consisting of a benzene, naphthalene and biphenylene radical, $R_2$ is a member selected from the group consisting of a benzene, naphthalene, biphenylene,

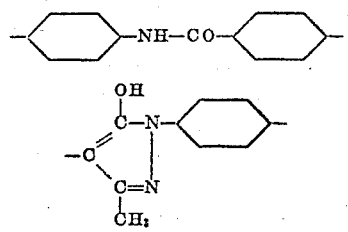

radical, and $R_3$ is a member selected from the group consisting of a benzene, a biphenylene, a stilbene, a benzoylanilino, a dihydrothiotoluidine, an acetic acid anilide and a naphthalene radical, and which dyestuff contains at least two sulfonic acid groups.

2. Complex copper compounds of the polyazo-dyestuffs of the formula

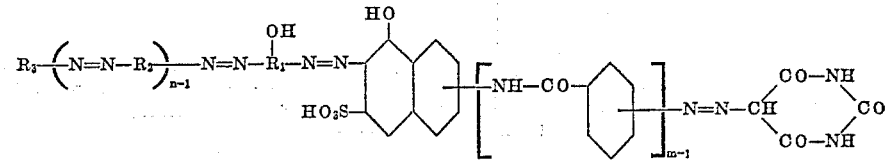

in which $n=2$, $m=1$ and $R_2$ represents a 5-pyrazolone radical which is bound in the 4-position to the $R_3-N=N-$group and in the 1-position through a phenylene group to the $-N=N-R_1=$group, $R_1$ being a naphthalene and $R_3$ a benzene radical containing a sulfonic acid group.

3. Complex copper compounds of the polyazo-dyestuffs of the formula

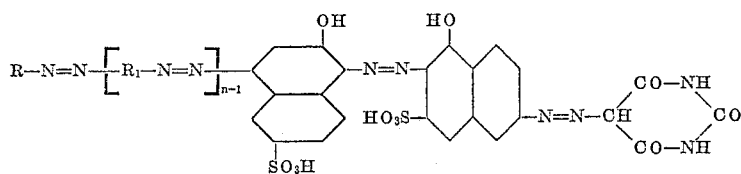

in which $n$ is a whole number up to 2, R represents a benzene nucleus and $R_1$ a 1-phenyl 5-pyrazolone radical bound to R—N=N— in 4 position and to the other azo linkage through the phenyl substituent in its 1-position.

4. The complex copper compound of the formula

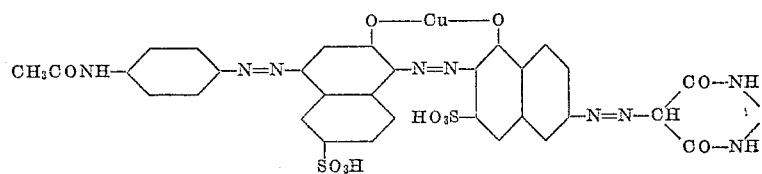

5. The complex copper compound of the formula

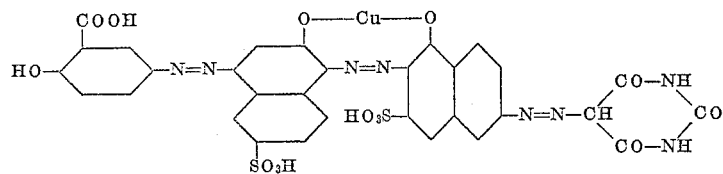

6. The complex copper compound of the formula

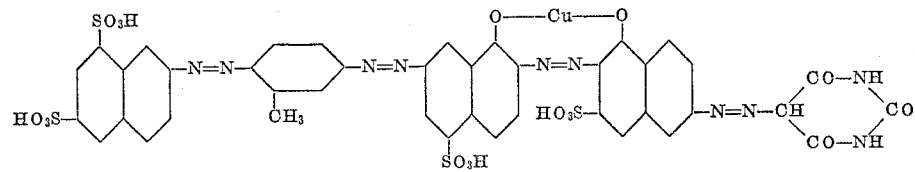

7. The complex copper compound of the formula

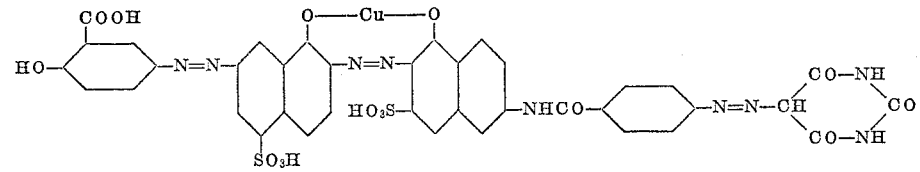

8. The complex copper compound of the formula

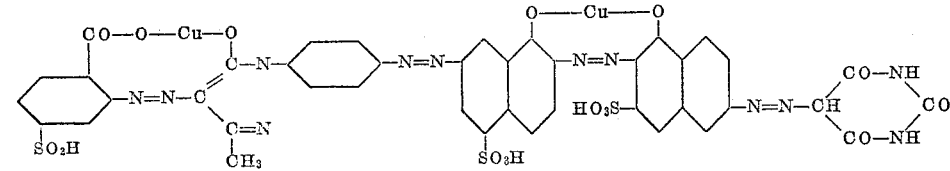

No references cited.

UNITED STATES PATENT OFFICE
CERTIFICATE OF CORRECTION

Patent No. 3,078,266             February 19, 1963

Walter Hanhart

It is hereby certified that error appears in the above numbered patent requiring correction and that the said Letters Patent should read as corrected below.

Column 1, line 54, for "aminonaphthlo" read -- aminonaphthol --; column 2, line 14, for "cholro-anilines" read -- chloro-anilines --; column 11, line 63, strike out "from"; columns 13 and 14, at the bottom of the page, extreme left-hand portion of the formula should appear as shown below instead of as in the patent:

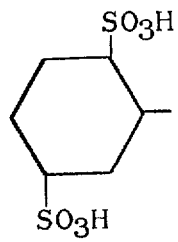

column 15, line 5, for "bartituric" read -- barbituric --; line 9, for "weekly" read -- weakly --; columns 17 and 18, formula in claim 4, the extreme right-hand portion of the formula should appear as shown below instead of as in the patent:

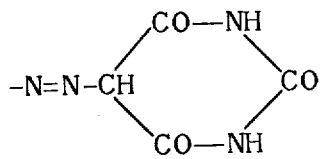

same columns 17 and 18, the formula of claim 6 should appear as shown below instead of as in the patent:

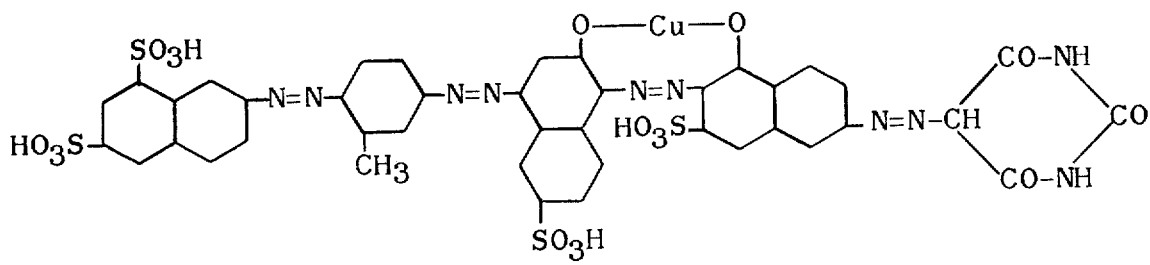

same columns 17 and 18, the formula of claim 7 should appear as shown below instead of as in the patent:

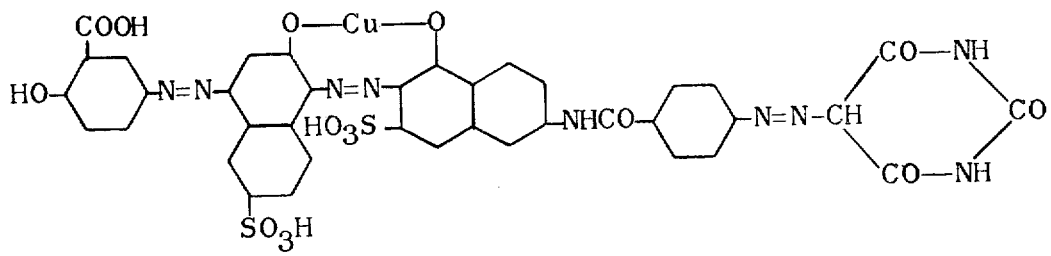

same columns 17 and 18, the formula of claim 8 should appear as shown below instead of as in the patent:

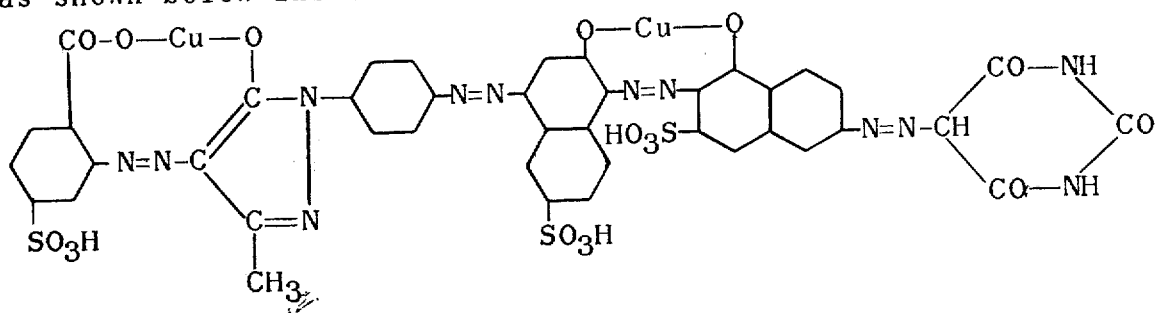

Signed and sealed this 24th day of December 1963.

(SEAL)
Attest:

ERNEST W. SWIDER
Attesting Officer

EDWIN L. REYNOLDS
Acting Commissioner of Patents